United States Patent [19]
Colle et al.

[11] Patent Number: 6,107,531
[45] Date of Patent: *Aug. 22, 2000

[54] METHOD FOR INHIBITING HYDRATE FORMATION

[75] Inventors: Karla S. Colle, Houston, Tex.;
Christine A. Costello, Easton, Pa.;
Larry D. Talley, Friendswood; Russell H. Oelfke, Houston, both of Tex.;
Enock Berluche, Phillipsburg, N.J.

[73] Assignee: ExxonMobil Upstream Research Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/973,110
[22] PCT Filed: Jun. 7, 1996
[86] PCT No.: PCT/US96/10003
§ 371 Date: Jan. 6, 1998
§ 102(e) Date: Jan. 6, 1998
[87] PCT Pub. No.: WO96/41786
PCT Pub. Date: Dec. 27, 1996

Related U.S. Application Data

[62] Division of application No. 08/659,550, Jun. 6, 1996, Pat. No. 5,744,665
[60] Provisional application No. 60/000,070, Jun. 8, 1995, and provisional application No. 60/000,071, Jun. 8, 1995.

[51] Int. Cl.$^7$ .................. C07C 7/20; F17D 1/05
[52] U.S. Cl. .............. 585/15; 585/950; 95/153; 137/13
[58] Field of Search ........... 585/15, 950; 95/153; 137/3, 13

[56] References Cited

U.S. PATENT DOCUMENTS

| | | | |
|---|---|---|---|
| H1749 | 9/1998 | Colle et al. | 585/15 |
| 3,696,085 | 10/1972 | Lederer et al. | 260/80.3 |
| 4,132,535 | 1/1979 | Rivers, Jr. et al. | 55/23 |
| 4,856,593 | 8/1989 | Matthews et al. | 106/310 |
| 4,929,425 | 5/1990 | Hoots et al. | 422/13 |
| 4,973,775 | 11/1990 | Sugier et al. | 585/15 |
| 5,244,878 | 9/1993 | Sugier et al. | 507/90 |
| 5,331,105 | 7/1994 | Duncum et al. | 585/800 |
| 5,420,370 | 5/1995 | Sloan, Jr. | 585/15 |
| 5,426,258 | 6/1995 | Thomas et al. | 585/15 |
| 5,432,292 | 7/1995 | Sloan, Jr. | 585/15 |
| 5,434,323 | 7/1995 | Durand et al. | 585/15 |
| 5,491,269 | 2/1996 | Colle et al. | 585/15 |
| 5,583,273 | 12/1996 | Colle et al. | 585/15 |
| 5,600,044 | 2/1997 | Colle et al. | 585/15 |
| 5,639,925 | 6/1997 | Sloan, Jr. | 585/15 |
| 5,744,665 | 4/1998 | Costello et al. | 585/15 |
| 5,817,898 | 10/1998 | Delion et al. | 585/15 |
| 5,841,010 | 11/1998 | Rabeony et al. | 585/3 |
| 5,900,516 | 5/1999 | Talley et al. | 585/15 |

FOREIGN PATENT DOCUMENTS

| | | |
|---|---|---|
| 0309210 A1 | 3/1989 | European Pat. Off. . |
| 0457375 A1 | 11/1991 | European Pat. Off. . |
| 0536950 A1 | 4/1993 | European Pat. Off. . |
| 0594479 A1 | 4/1994 | European Pat. Off. . |
| 2 101 441 | 2/1983 | United Kingdom . |
| WO93/25798 | 12/1993 | WIPO . |
| WO94/12761 | 6/1994 | WIPO . |
| WO95/32356 | 11/1995 | WIPO . |

OTHER PUBLICATIONS

T. V. Sheremeteva, G. N. Larina, V. N. Tsvetkov, and I. N.Shtennikova: "Influence of the Structure of Unsaturated Imides on Their Polymerizability and on the Polymer Properties" *J. Polymer Sci.: Part C*, No. 22, pp. 185–194 (1968).

Howard C. Haas and Ruby L. MacDonald, "Maleimide Polymers, I. A Polymeric Color Reaction" *Journal of Polymer Science: Polymer Chemistry Edition*, vol. 11, 327–343 (1973).

M. G. Bradbury, S. D. Hamann, and M. Linton, "Solid–phase Polymerizations at High Pressures", *Aust. J. Chem.*, vol. 23, pp. 511–23 (1970).

Y. Nakayama and G. Smets, "Radical and Anionic Homopolymerization of Maleimide and N–n–Butylmaleimide", *Journal of Polymer Science: Part A–1*, vol. 5, pp. 1619–1633 (1967).

Hiroshi Aida, Iwao Takase, and Takashi Nozi, "UV–induced polymerization of maleimides in solution", *Makromol. Chem.* vol. 190, pp. 2821–2134 (1989).

Tokio Hagiwara, Tsutomu Someno, Hiroshi Hamana, and Tadashi Narita, "Anionic Polymerization of N–Substituted Maleimide. II. Polymerization of N–Ethylmaleimide", *Journal of Polymer Science: Part A: Polymer Chemistry*, vol. 26, pp. 1011–1020 (1988).

(List continued on next page.)

*Primary Examiner*—Walter D. Griffin
*Attorney, Agent, or Firm*—K. D. Van Tassel; D. Y. Wolfs

[57] ABSTRACT

A method for inhibiting the formation of clathrate hydrates in a fluid having hydrate-forming constituents involves treating the fluid with an inhibitor comprising a substantially water soluble polymer having a polymer backbone .with a pendant $C_1$—$C_3$ alkyl group; the polymer having an average molecular weight between about 1,000 and about 6,000,000. Preferably, the pendant alkyl group is a methyl group. The rate of nucleation, growth, and/or agglomeration of gas hydrate crystals in a petroleum fluid stream Is reduced using the alkylated polymer backbone inhibitor, thereby inhibiting the formation of a hydrate blockage in the pipe conveying the petroleum fluid stream. Test results are disclosed which unexpectedly show that alkylating the polymer backbone with a methyl group will produce a subcooling for the alkylated polymer that is at least about 2° F. (about 1.1° C.) greater than its nonalkylated counterpart. The inhibitor can be used conveniently at low concentrations, for example in the range of from about 0.01% to about 5% by weight of the water present in the oil or gas stream, to effectively treat a petroleum fluid having a water phase.

24 Claims, No Drawings

OTHER PUBLICATIONS

T. C. Sandreczki and I. M. Brown, "Characterization of the Free–Radical Homopolymerization of N–Methylmaleimide", *Macromolecules*, vol. 23, pp. 1979–1983 (1990).

C. H. Bamford and J. W. Burley, "Ionic end–groups in polymaleimide", Polymer, vol. 14, pp. 394–395 (1973).

D. Fles and R. Vukovic, "High Conversion Copolymerization of α–Methylstyrene with N–Methylmaleimide or N–Phenylmaleimide", *J. Macromol. Sci–Chem.*, A27 (13&14), pp. 1621–1630 (1990).

R. K. Sadhir and J. D. B. Smith, "Laser–Initiated Copolymerization of N–VinylPyrrolidone with Maleic Anhydride and Maleimide", *Journal of Polymer Science: Part A: Polymer Chemistry*, vol. 30, pp. 585–595 (1992).

Tsutomu Kagiya, Masatsugu Izu, Shunzo Kawai, and Kenichi Fukui, "Solid–State Polymerization of Maleimide by 2,2'–Azobisisobutyronitrile", *Journal of Polymer Science: Part A–1*, vol. 6(6), pp. 1719–1728 (1968).

METHOD FOR INHIBITING HYDRATE FORMATION

This application is based on copending U.S. provisional patent application, Ser. No. 60/000,070, filed on Jun. 8, 1995 and is related to copending U.S. regular patent application, Ser. No. 08/624,277, based on U.S. provisional application Nos. 60/000,065, and to filed Jun. 8, 1995, copending U.S. regular patent application Ser. No. 08/659,550, based on U.S. provisional patent application No. 60/000,071, filed on June 8, 1995 now U.S. Pat. No. 5,744,665, and to U.S. Pat. No. 5,936,040, a divisional of U.S. Pat. application Ser. No. 08/659550, filed Jun. 6, 1996, now U.S. Pat. No. 5,744,665.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature, clathrate hydrates can form when such petroleum fluid constituents or other hydrate formers are mixed with water. Clathrate hydrates are water crystals which form a cage-like structure around guest molecules such as hydrate-forming hydrocarbons or gases. Some hydrate-forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate-forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1 MPa ethane can form gas hydrates at temperatures below 4° C., and at a pressure of 3 MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 30% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate-forming constituents. The method comprises treating the fluid with an inhibitor comprising a substantially water soluble polymer having a polymer backbone, wherein the polymer backbone has at least two pendant groups, the first of the pendant groups having at least two atoms selected from the group consisting of carbon, nitrogen and oxygen and the second of the pendant groups is a $C_1$—$C_3$ alkyl group, the polymer having an average molecular weight between about 1,000 and 6,000,000. Preferably, the second pendant group is a methyl group.

DETAILED DESCRIPTION OF THE INVENTION

Inventive Method

The inventive method inhibits the formation of clathrate hydrates in a fluid having hydrate-forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved in an appropriate carrier solvent or liquid to make a concentrated solution or mixture. It should be understood that many liquids may effectively facilitate treatment of the fluid stream without dissolving the inhibitor. For convenience, such liquids are referred to hereafter as solvents whether they produce an inhibitor solution, emulsion, or other type of mixture. The principal purpose of the solvent is to act as a carrier for the inhibitor and to facilitate the absorption of the inhibitor into the aqueous phase of the petroleum fluid. Any solvent suitable for delivering the inhibitor to aqueous phase of the fluid may be used. Such carrier solvents include, but are not limited to, water, brine, sea water, produced water, methanol, ethanol, propanol, isopropanol, glycol, and mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent, the chemical composition of the inhibitor, the system temperature, and the solubility of the inhibitor in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First, an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the viscosity of the inhibitor solution is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools, it will eventually reach a temperature, known as the hydrate equilibrium dissociation temperature or $T_{eq}$, below which hydrate formation is thermodynamically favored. The $T_{eq}$ of a petroleum fluid shifts as the pressure applied to the fluid and the composition of the fluid change. Various methods of determining a fluid's $T_{eq}$ at various fluid compositions and pressures are well known to those skilled in the art. Preferably, the fluid should be treated with the inhibitor when the fluid is at a temperature greater than $T_{eq}$. It is possible, but not preferable, to introduce the inhibitor while the temperature is at or slightly below the $T_{eq}$ of the fluid, preferably before clathrate hydrates have begun to form.

The quantity of inhibitor introduced into a petroleum fluid with an aqueous phase solvent is typically in the range of from about 0.01 wt% to about 5 wt% of the water present in the fluid. Preferably, the inhibitor concentration is about 0.5 wt%. For example, a laboratory study has shown that adding 0.5 wt% of a copolymer of N-methyl-N-vinylacetamide and methacryloylpyrrolidine (VIMA/MAPYD) to a petroleum fluid allowed the fluid to cool to a temperature which was about 16.4° C. below its $T_{eq}$ without formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the cost of the inhibitor.

Inhibitor Description

The term "homopolymer" as used herein includes a polymer having the same monomeric repeating unit, while the term "copolymer" as used herein includes polymers having two or more different monomeric repeating units. Consequently, the term "polymer" would include all types of polymers including homopolymers, copolymers, and polymer mixtures.

Compounds belonging to the group of substantially water soluble polymers having alkylated backbones described below, and mixtures thereof, are effective inhibitors of hydrate nucleation, growth, and/or agglomeration (collectively referred to as hydrate formation). Such alkylated backbone polymers may be used in mixture with other substantially water soluble polymers, including but not limited to, poly(vinylpyrrolidone), poly(vinylcaprolactam), polyacrylamides, copolymers of vinylpyrrolidone, vinylcaprolactam, and/or acrylamides, poly(N-methyl-N-vinylacetamide), copolymers of N-methyl-N-vinylacetamide and isopropylmethacrylamide, copolymers of N-methyl-N-vinylacetamide and acryloylpiperidine, copolymers of N-methyl-N-vinylacetamide and methacryloylpyrrolidine, and copolymers of N-methyl-N-vinylacetamide and acryloylpyrrolidine.

Without limiting the scope of the invention, and for the purpose of illustrating the invention, various water soluble acrylamide and oxazoline polymers having alkylated backbones were evaluated including homopolymers, poly(isopropylmethacrylamide) (PiPMAM) and poly(2-isopropenyl-2-oxazoline) (PiPpenOx) and the copolymers of N-methyl-N-vinylacetamide and iso-propylmethacrylamide (VIMA/iPMAM), of N-methyl-N-vinylacetamide and methacryloylpyrrolidine (VIMA/MAPYD), and EPOCROS® WS-300, a terpolymer of methyl methacrylate, ethyl acrylate and iso-propenyloxazoline supplied by Nippon Shokubai.

Poly(iso-propylmethacrylamide)

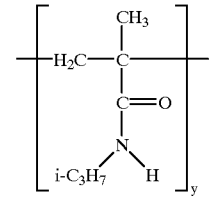

PiPMAM

Copolymer of N-methyl-N-vinylacetamide and iso-propylmethacrylamide

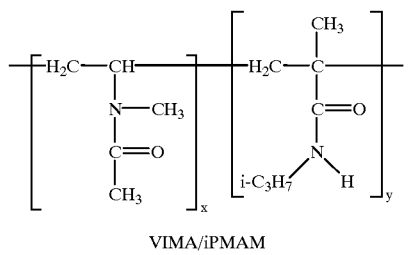

VIMA/iPMAM

Copolymer of N-methyl-N-vinylacetamide and methacry-loylpyrrolidine

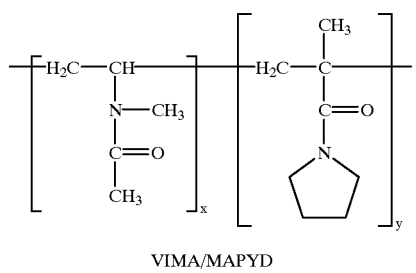

VIMA/MAPYD

Poly(2-iso-propenyl-2-oxazoline)

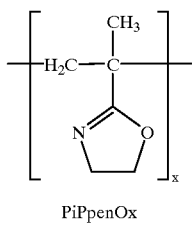

PiPpenOx

Terpolymer of methyl methacrylate, ethyl acrylate and iso-propenyloxazoline

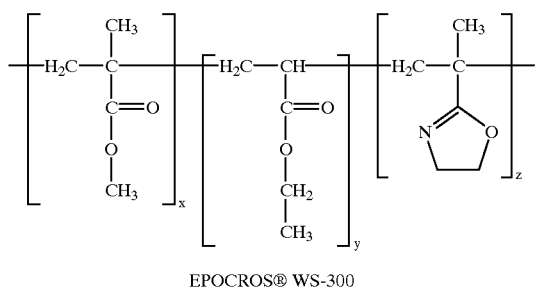

EPOCROS® WS-300

Other substantially water soluble polymers which are effective as gas hydrate inhibitors are also expected to demonstrate improved inhibition activity by methylating their backbones. Such polymers include vinyllactams such as poly(N-vinylpyrrolidone) (PVP) and poly(N-vinylcaprolactam) (PVCap), N-vinyl amides such as poly(vinylacetamide) (PVIMA) and poly(N-vinyl-N-n-propylpropionamide) (PVPP), and maleimides such as poly(ethylmaleimide) (PEME) and poly(cyclohexylmaleimide) (PCHME), as well the copolymers of such vinyllactams, N-vinyl amides, and maleimides. The homopolymers and copolymers of other acrylamides and oxazolines having alkylated polymer backbones, besides those specifically identified above, are also expected to demonstrate improved inhibition activity.

INHIBITOR SYNTHESIS

General Procedure

N-methyl-N-vinylacetamide (VIMA) is commercially available or may be synthesized according to published procedures (see e.g., A. I. Askenov, et al., *Zhurnal Obschei Khimii*, 57 (2), pp. 1634–1637 (1987)). Many of the vinyl monomers used in synthesizing various VIMA copolymers described below are commercially available. Acrylamide monomers which were not available were synthesized from the appropriate amine and acryloyl chloride according to published procedures (see e.g., S. Ito, *Kobunshi Ronbunshu*, 46 (7), pp. 437–443 (1989)). Poly(iso-propylacrylamide) (PiPAM) does not have a methylated backbone but was evaluated for comparative purposes. PiPAM was obtained from Monomer-Polymer Laboratories (Windham, NH). Poly (2-iso-propenyl-2-oxazoline) (PiPpenOx) was obtained from Nippon Shokubai (Tokyo, Japan).

Standard laboratory procedures familiar to those skilled in the art were used to synthesize the evaluated polymers and copolymers identified above. Benzene or low molecular weight alcohols were used as solvents. 2,2-azobis(2-methylpropionitrile) (AIBN) was used as the free radical initiator. The polymers were isolated and characterized using techniques well-known to those skilled in the art, such as $^{13}C$ and $^{1}H$ NMR and gel permeation chromatography, to confirm their structures. Some examples of synthesis procedures that may be adapted to synthesizing other polymers and copolymers similar to those identified above are provided below.

Polymerization of Other N-Vinyl Amide Monomers

Other N-vinyl amide monomers may be used to produce higher analogs of N-vinyl amide homopolymers (e.g., PVPP) according to published procedures known to those skilled in the art of polymer synthesis, see e.g., A. I. Askenov, et al., *Zhurnal Obschei Khimii*, 57 (2), pp. 1634–1637 (1987), Hartwimmer et al., U.S. Pat. No. 3,531, 471, and Lederer et al., U.S. Pat. No. 3,696,085.

Polymerization of poly(iso-propylmethacrylamide) (PiPMAM) and poly(iso-12roalacrlamide) (PiPA4)

Starting materials: N-Iso-propylmethacrylamide (Aldrich) was purified by recrystallization from hexane twice. Distilled, deionized water was deoxygenated by purging with nitrogen while boiling for 1 hour. Purging was continued while the water was cooled to room temperature. The initiator, ammonium persulfate, was used as received.

PiPMAM synthesis procedure: N-Iso-propylmethacrylamide (6.4 g, 50.3 mmol) was charged to a 4-necked flask fitted with a condenser, a thermometer, a mechanical stirrer, and a nitrogen inlet/outlet. Then 122 g of the purged water was added with stirring and the solution purged while the reaction temperature was brought to 60° C. Once the solution was at temperature, ammonium persulfate (61 mg, 0.267 mol) was added. The reaction was allowed to proceed overnight at 60° C. under nitrogen with stirring. As the polymerization proceeded, the solution became turbid. The following day, the turbid solution was freeze-dried in a commercially available freeze-drier according to the directions provided by the manufacturer. The dry polymer was dissolved in a minimum amount of methanol and precipitated into diethylether. The polymer was then filtered, redissolved, and the precipitation procedure was repeated.

The isolated polymer was dried overnight in a vacuum oven at 60° C. and $10^3$ torr. The $^1$H and $^{13}$C NMR spectra of this material was consistent with that for PiPMAM.

Poly(iso-propylacrylamide) (PiPAM) was made and characterized using substantially similar procedures described above for PiPMAM.

Copolymerization of N-methyl-N-vinylacetamide (VIMA) and Substituted Acrylamides In general, the copolymerization of VIMA with acrylamides, specifically N-substituted (or N,N-disubstituted) acrylamides is slow. Thus, if the two monomers are charged together in a batch copolymerization, the N-substituted acrylamide will polymerize to some extent, as a homopolymer, or at least a copolymer that is very rich in the acrylamide. To alleviate this problem, a pumping process is used to ensure that the VIMA is substantially incorporated into the copolymer. In general, the VIMA is charged to a reactor with initiator. The "faster" reacting monomer, the N-substituted acrylamide, is pumped into the VIMA solution. The optimum addition time is based on the relative reactivity of the comonomers. For our purposes, a pumping time of two to four hours was adequate. An example of this procedure is given below for the copolymerization of N-methyl-N-vinylacetamide (VIMA) and N-iso-propylmethacrylamide (iPMAM) to produce a VIMA/iPMAM copolymer.

Copolymerization of N-methyl-N-vinylacetamide CYIMA) and N-iso-propylmethacrvlamide (iPMAM)

N-iso-propylmethacrylamide was purchased from Aldrich and recrystallized twice from hexane. Anhydrous benzene was purchased from Aldrich and used without further purification. All transfers were done under an inert atmosphere. N-methyl-N-vinylacetamide was purchased from Aldrich and purified by fractional distillation. AIBN was recrystallized from methanol.

VIMA (8.43 g (0.066 mol)) was passed through a commercially available inhibitor removal column and dissolved in benzene (45 ml). This solution was charged to a 3-necked flask equipped with a condenser, stirrer, nitrogen inlet/outlet, and a port through which the iPMAM was pumped. The VIMA/benzene solution was purged further with $N_2$ for ½ hour. A solution of IPMAM (6.57 g (0.663 mol) in 90 ml benzene) was purged for ½ hour, then charged to a syringe pump. After purging the reaction kettle containing the VIMA solution, it was brought to 60° C. The reaction was initiated by injecting an AIBN solution (0.115 g in 2 cc benzene) into the VIMA solution. Then the iPMAM solution was pumped in over the next 2 and ½ hours. After pumping was completed, the reaction mixture was kept at 60° C. under nitrogen with stirring. The next day, it was precipitated into an excess of hexane, redissolved in a minimum amount of THF, then reprecipitated into hexane. The sample was then dried under vacuum at 60° C. at $10^3$ torr. The final yield of purified copolymer was 6 g (40%). $^{13}$C NMR indicated that the VIMA/iPMAM ratio was 13/87.

INHIBITOR EVALUATION

Mini-Loop Testing Procedure

One method for evaluating the effectiveness of an inhibitor uses a bench-scale high pressure apparatus referred to as a mini-loop apparatus. A mini-loop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume SSW (Synthetic Sea Water) solution having about 3.5% total ionized salts, 40% by volume hydrocarbon condensate (i.e., $C_6$+), and 20% by volume hydrocarbon gas mixture is circulated around the loop at constant pressure. The hydrocarbon gas mixture is comprised of about 76 mole% methane, 9 mole% ethane, 7 mole% propane, 5 mole% n-butane, 2 mole% iso-butane, and 1 mole% of $C_5$+. The inhibitor is typically injected into the loop as an aqueous solution to produce the desired weight percent concentration of inhibitor in the aqueous sea salt/gas solution. Generally, many hydrate inhibitors are evaluated at about 0.5 wt.% of the aqueous sea salt/gas solution.

The fluid is circulated at a constant velocity of about 2.5 feet/second. The loop and its pump lay in a controlled temperature water bath for controlling the temperature of the fluid circulating in the loop. Water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop, a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Mini-loop tests are typically run at a pressure of about 1,000 pounds per square inch gauge (p.s.i.g.). However, any pressure between 0 and 3,000 p.s.i.g. could be selected for evaluating the performance of an inhibitor.

The temperature of the water bath is reduced at a constant rate, preferably about 6° F. or 3.3° C. per hour, from an initial temperature of about 70° F. or 21° C. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{OS}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{OS}$ which is known as the inhibitor's subcooling temperature, $T_{sub}$. Therefore, for a given pressure, the greater the subcooling temperature the more effective the inhibitor. Typically, an aqueous sea salt/gas solution with no inhibitor present produces a $T_{sub}$ of about 6–7° F. or 3.3–3.9° C.

The subcooling results in Table 1 below were all obtained at 1,000 psig using the test fluid composition described above. Therefore, to compare the inhibitor performance results below with other inhibitors, such other inhibitors should be evaluated under similar test conditions, with particular attention directed to the test fluid composition and the pressure the test is conducted under.

Mini-Loop Test Results

Without limiting the scope of the invention, and for the purpose of illustrating the invention, various homopolymers and copolymers having methylated backbones were evaluated using the mini-loop testing procedure described above. The results of these evaluations are presented below:

TABLE 1

MINI-LOOP TEST RESULTS WITH POLYMERIC INHIBITORS

| INHIBITOR | RATIO | CONC. WT % | MINI-LOOP SUB-COOLING TEMP. (° F.) | MINI-LOOP SUB-COOLING TEMP. (° C.) |
|---|---|---|---|---|
| None | — | — | 7.0 | 3.9 |
| PiPAM | NA | 0.5 | 20.0 | 11.1 |
| PiPMAM | NA | 0.5 | 24.0 | 13.3 |
| PVIMA | NA | 0.5 | 12.5 | 6.9 |
| VIMA/iPAM | 42:58 | 0.5 | 24.0 | 13.3 |
| VIMA/iPMAM | 40:60 | 0.5 | 29.0 | 16.1 |
| VIMA/iPMAM | 13:87 | 0.5 | 27.0 | 15.0 |
| VIMA/APYD | 31:69 | 0.5 | 28.0 | 15.6 |
|  | 30:70 | 0.5 | 24.0 | 13.3 |
| VIMA/APYD | 49:51 | 0.5 | 25.0 | 13.9 |
| VIMA/MAPYD | 40:60 | 0.5 | 29.5 | 16.4 |
| PiPpenOx | NA | 0.5 | 21.7 | 12.1 |
| PiPpenOx terpolymer EPOCROS® WS-300 | Undisclosed trade secret | 0.5 | 16.7 | 9.3 |

The results in Table 1 indicate that water soluble polymers with alkylated backbones are effective as clathrate hydrate inhibitors. Alkylating the backbone appears to enhance the hydrate inhibition activity of various water soluble polymers. Comparing the subcooling results of comparable polymers with nonalkylated versus alkylated backbones, we see that PiPAM (nonalkylated) has a 20.0° F. (11.1° C.) subcooling versus the 24.0° F. (13.3° C.) subcooling for PiPMAM (methylated) and VIMA/iPAM (nonalkylated) has a 24.0° F. (13.3° C.) versus the 29.0° F. (16.1° C.) subcooling for VIMA/iPMAM (methylated). Also, VIMA/APYD (nonalkylated), in a ratio of about 30:70, has an average subcooling of 26.0° F. (14.4° C.) and, in a ratio of about 50:50, has a subcooling of 25.0° F. (13.9° C.) versus the 29.50° F. (16.4° C.) subcooling for VIMA/MAPYD (methylated). Moreover, if the nonalkylated counterpart to PiPpenOx was synthesized, its subcooling, with reasonable certainty, is expected not to exceed about 18° F. (about 10° C.) versus the 21.7° F. (12.1 ° C.) subcooling for PiPpenOx.

Consequently, alkylating the backbone surprisingly and unexpectedly enhances the polymer's hydrate inhibition activity. As indicated by the results in Table 1, alkylating the backbone of a polymer with at least one methyl group will produce a subcooling for the alkylated polymer that is at least about 2° F. (about 1.1° C.) greater than its nonalkylated counterpart. It is also believed that alkylating the backbone of a polymer with either an ethyl or propyl group could similarly improve the polymer's subcooling performance.

The means and method invention and the best mode contemplated for practicing the invention have been described. It is to be understood that the foregoing is illustrative only and that other means and techniques can be employed without departing from the true scope of the invention claimed herein.

INDUSTRIAL APPLICABILITY

The method of the present invention is useful for inhibiting the formation of clathrate hydrates in a fluid, especially in pipe or conduit used to produce and/or transport natural gas or other petroleum fluid.

What is claimed is:

1. A method for inhibiting the formation of clathrate hydrates in a fluid having hydrate-forming constituents comprising treating the fluid with an inhibitor comprising a substantially water soluble polymer having an alkylated polymer backbone and a monomeric repeating unit selected from the group consisting of alkylacrylamides, alkylacrylates, and mixtures thereof, wherein the polymer backbone has a pendant alkyl group that is a $C_1$ to $C_3$ alkyl group, said polymer having an average molecular weight between about 1,000 and 6,000,000.

2. A method according to claim 1, wherein the inhibitor further comprises a solvent, wherein said solvent is selected from the group consisting of water, brine, sea water, produced water, methanol, ethanol, propanol, isopropanol, glycol, and mixtures thereof.

3. A method according to claim 1, wherein said inhibitor is added in a concentration in the range of from about 0.01 wt% to about 5 wt% of water present in the fluid.

4. A method according to claim 1, wherein said inhibitor is added in a concentration of about 0.5 wt% of water present in the fluid.

5. The method according to claim 1 wherein said polymer backbone pendant alkyl group is a methyl group.

6. The method of claim 5 wherein the inhibitor is an iso-propyl methacrylamide homopolymer.

7. The method of claim 5 wherein the inhibitor is a methylmethacrylate homopolymer.

8. The method according to claim 1 wherein said polymer backbone pendant alkyl group is an ethyl group.

9. The method according to claim 1 wherein said polymer backbone pendant alkyl group is a propyl group.

10. The method of claim 1 wherein the fluid is a petroleum fluid.

11. The method of claim 10 wherein the inhibitor further comprises a solvent selected from the group consisting of water, brine, sea water, produced water, methanol, ethanol, propanol, isopropanol, glycol, and mixtures thereof.

12. The method of claim 11 wherein the solvent is selected from the group consisting of water, brine, sea water, produced water, and mixtures thereof.

13. The method of claim 12 wherein the inhibitor is added in a concentration of about 0.5 wt % of the water present in the fluid.

14. The method of claim 11 wherein the inhibitor is added in a concentration in the range of from about 0.01 wt % to about 5 wt% of water present in the fluid.

15. A method according to claim 1, wherein said inhibitor further comprises an additive selected from the group consisting of poly(vinylpyrrolidone), poly(vinylcaprolactam), polyacrylamides, copolymers of vinylpyrrolidone, vinylcaprolactam, and/or acrylamides, poly(N-methyl-N-vinylacetamide), copolymers of N-methyl-N-vinylacetamide and iso-propylmethacrylamide, copolymers of N-methyl-N-vinylacetamide and acryloylpiperidine, copolymers of N-methyl-N-vinylacetamide and methacryloylpyrrolidine, and copolymers of N-methyl-N-vinylacetamide and acryloylpyrrolidine.

16. A method for inhibiting the formation of clathrate hydrates in a petroleum fluid having hydrate-forming constituents comprising treating the fluid with an inhibitor comprising a substantially water soluble polymer having a monomeric repeating unit selected from the group consisting of alkylmethacrylamides, alkylmethacrylates, and mixtures thereof, said polymer having an average molecular weight between about 1,000 and 6,000,000.

17. The method of claim 16 wherein the inhibitor further comprises a solvent selected from the group consisting of water, brine, sea water, produced water, methanol, ethanol, propanol, isopropanol, glycol, and mixtures thereof.

18. The method of claim 17 wherein the solvent is selected from the group consisting of water, brine, sea water, produced water, and mixtures thereof.

19. The method of claim 18 wherein the inhibitor is added in a concentration in the range of from about 0.01 wt % to about 5 wt% of water present in the fluid.

20. The method of claim 16 wherein the inhibitor is an alkylmethacrylamide homopolymer.

21. The method of claim 20 wherein the inhibitor is an iso-propyl methacrylamide homopolymer.

22. The method of claim 20 wherein the inhibitor is added in a concentration of about 0.5 wt % of the water present in the fluid.

23. The method of claim 16 wherein the inhibitor is an alkylmethacrylate homopolymer.

24. The method of claim 23 wherein the inhibitor is a methylmethacrylate homopolymer.

* * * * *